US012761950B2

(12) United States Patent
Yaratapally et al.

(10) Patent No.: US 12,761,950 B2
(45) Date of Patent: Oct. 13, 2026

(54) TASK PRIORITIZATION BASED ON CURRENT CONDITIONS

(71) Applicant: Oracle International Corporation, Redwood Shores, CA (US)

(72) Inventors: Ram Mohan Yaratapally, Hyderabad (IN); Vaibhav Goyal, Jaipur (IN); Kristam Raghavendra, Andhra Pradesh (IN); Chalapathirao Annapragada, Belmont, CA (US); Vishwa Prasad, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 916 days.

(21) Appl. No.: 18/165,740

(22) Filed: Feb. 7, 2023

(65) Prior Publication Data

US 2024/0264862 A1 Aug. 8, 2024

(51) Int. Cl.
*G06F 9/48* (2006.01)

(52) U.S. Cl.
CPC .................................. *G06F 9/4881* (2013.01)

(58) Field of Classification Search
CPC ..................................................... G06F 9/4881
See application file for complete search history.

(56) References Cited

U.S. PATENT DOCUMENTS 8,015,564 B1 * 9/2011 Beyer ..................... G06F 9/505 718/103
10,713,088 B2 * 7/2020 Hosmani ............... G06F 9/4806
2014/0101673 A1 4/2014 Klyuchevskyy et al.

OTHER PUBLICATIONS

"Automatic dependency detection", Retrieved from https://www.dynatrace.com/platform/artificial-intelligence/dependency-detection/ , Retrieved on Sep. 29, 2022, pp. 10.
"Efficient concurrent recalculation of a dynamic subset of nodes & their dependencies in a directed acyclic graph", Retrieved from https://solveforum.com/forums/threads/solved-efficient-concurrent-recalculation-of-a-dynamic-subset-of-nodes-their-dependencies-in-a-directed-acyclic-graph.149584/, Sep. 12, 2021, pp. 13.
Cai et al., "D 2ABS: A Framework for Dynamic Dependence Analysis of Distributed Programs", Aug. 2015, vol. 14, No. 8, pp. 27.
Etsion et al., "Task Superscalar: An Out-of-Order Task Pipeline", 2010 43rd Annual IEEE/ACM International Symposium on Microarchitecture, 2010, pp. 89-100.
Pearce et al., "A Dynamic Topological Sort Algorithm for Directed Acyclic Graphs", ACM Journal of Experimental Algorithmics, vol. 11, Article No. 1.7, 2006, pp. 1-24.
Rajak R., "A Novel Approach for Task Scheduling in Multiprocessor System", International Journal of Computer Applications (0975-8887), vol. 44, No. 11, Apr. 2012.

* cited by examiner

*Primary Examiner* — Wissam Rashid
(74) *Attorney, Agent, or Firm* — Invoke

(57) ABSTRACT

A system continually or periodically computes priority scores for unexecuted tasks. The system selects and executes tasks based on respective priority scores. The priority score for a particular unexecuted task may be computed as a function of a set of tasks that currently depend on the particular unexecuted task. The priority score for the particular unexecuted task may increase or decrease as the set of tasks, that depend on the particular unexecuted task, increase or decrease.

23 Claims, 7 Drawing Sheets

109

401 403 405 407

409

| TASK | TIME | DEPENDENTS | DEPENDENCIES |
|---|---|---|---|
| N1 | 1 MIN. | | N3, N4 |
| N2 | 1 MIN. | | N4, N5, N6 |
| N3 | 1 MIN. | N1 | |
| N4 | 1 MIN. | N1, N2 | N7 |
| N5 | 1 MIN. | N2 | N6 |
| N6 | 1 MIN. | N2, N5 | N7, N8 |
| N7 | 1 MIN. | N4, N6 | |
| N8 | 1 MIN. | N6 | |

TASK PRIORITIZATION BASED ON CURRENT CONDITIONS

TECHNICAL FIELD

The present disclosure relates to task scheduling and, more specifically, to scheduling workloads having interdependent tasks in multi execution environment.

BACKGROUND

Jobs executed by computing systems can include a number of interdependent tasks. For example, a job can comprise a sequence of tasks in which performance of a first task depending on successful completion of other tasks. Accordingly, a computing system may include a scheduler that determines an efficient order of execution for the tasks. As the complexity of the job increases, so do the quantity of tasks and dependencies. In addition, determining an efficient order for executing tasks becomes substantially more complex. The complexity is further increased in environments having multiple executors allowing processing of multiple tasks simultaneously.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

The embodiments are illustrated by way of example and not by way of limitation in the figures of the accompanying drawings. In the drawings.

DETAILED DESCRIPTION

Figure 1:
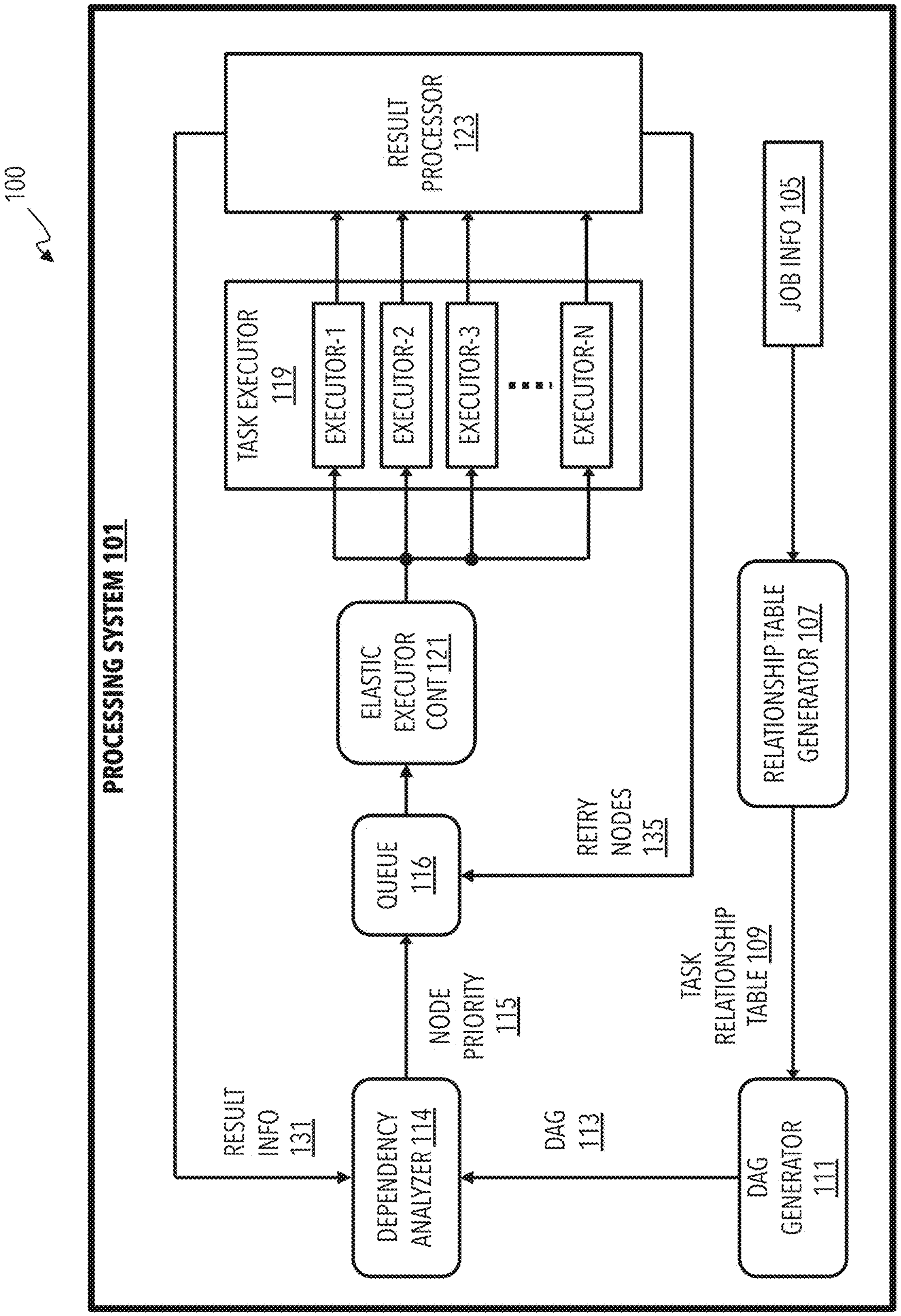
FIG. 1 illustrates a functional flow block diagram of an example system in accordance with one or more embodiments.

In the following description, for the purposes of explanation, numerous specific details are set forth in order to provide a thorough understanding. One or more embodiments may be practiced without these specific details. Features described in one embodiment may be combined with features described in different embodiments. In some examples, well-known structures and devices are described with reference to a block diagram in order to avoid unnecessarily obscuring the present invention.

The embodiments are illustrated by way of example and not by way of limitation in the figures of the accompanying drawings. It should be noted that references to "an" or "one" embodiment in this disclosure are not necessarily to the same embodiment, and they mean at least one.

This Detailed Description section includes the following subsections:

A. GENERAL OVERVIEW
B. TASK EXECUTION ENVIRONMENT
C. TASK PRIORITIZATION ARCHITECTURE
D. MULTIPROCESSOR TASK SCHEDULING
E. SCHEDULING EXAMPLE
F. HARDWARE OVERVIEW
G. MISCELLANEOUS; EXTENSIONS

A. General Overview

One or more embodiments compute priority scores for unexecuted tasks based on currently detected conditions. The system can re-compute a different priority score for the same task as a result of changes in the detected conditions. The system then selects and executes one or more tasks based on the respective priority scores of the one or more tasks.

Embodiments assign a priority score for a particular unexecuted task based on a current set of unexecuted tasks that depend on the particular unexecuted task. A priority score assigned to a particular unexecuted task may change at runtime as the set of unexecuted tasks that depend on the particular unexecuted task change. In an example, a system computes a priority score to a particular unexecuted task as a function of a number of other tasks that directly or indirectly depend on the execution of the particular unexecuted task. At time T0, the system determines there are three tasks that depend on the particular unexecuted task. Based on three tasks depending on the particular unexecuted task, the system assigns the particular unexecuted task a priority score of three. At a later time T5, the particular unexecuted task still remains unexecuted. At the time T5, the system determines there are ten unexecuted tasks that depend on the execution of the particular unexecuted task. Based on ten tasks depending on the particular unexecuted task, the system modifies the priority score for the particular unexecuted task from three to ten. The priority score, computed for any particular unexecuted task, is a dynamic priority score as the priority score may change with each evaluation of the particular unexecuted task. In some embodiments, a task with the largest number of dependent tasks is executed first. In other embodiments, a task with the lowest number of dependent tasks is executed first.

The priority score can be computed as a function of one or more additional factors. Examples of additional factors that may be used for computing the priority score for the particular unexecuted task include, but are not limited to, an estimated execution time of the particular unexecuted task, an amount of time that has passed since execution of the particular unexecuted task was requested, and a static score that is associated with the particular unexecuted task.

One or more embodiments generate a directed acyclic graph (DAG) that represents unexecuted tasks. Nodes in the directed acyclic graph represent tasks. Outbound arrows from a particular node, representing a particular task, in the directed acyclic graph are connected to nodes that represent other unexecuted tasks that depend on the particular task. The system then assigns a priority to each particular task based on the number of outbound arrows from a node that represents the particular task. The task with the highest priority is selected and executed.

Embodiments improve the performance of multiprocessing computing systems by scheduling tasks for efficient throughput, increased utilization of the computing resources, and reduced waiting time for execution of tasks.

While this General Overview subsection describes various example embodiments, it should be understood that one or more embodiments described in this Specification or recited in the claims may not be included in this subsection.

B. Task Execution Environment

FIG. 1 shows a functional flow block diagram illustrating an example task execution environment 100 for implementing systems and processes in accordance with one or more embodiments. The task execution environment 100 includes a processing system 101, which can be one or more multiprocessor computing systems that execute computing jobs comprising a number of tasks. Tasks are units of work representing individual steps of a computing job executable independently of one another. For example, the job may be a computer program configured to produce a particular output. Tasks can be program modules or program objects included in the jobs. Some tasks are dependent on other tasks. For example, a first task depending on a second task of the job can be described as a "dependent" of the second task. Additionally, a third task depending from the first task can be described as a "dependency" of the first task.

Job information 105 can be metadata describing a job to be executed by the processing system 101. Job information 105 can describe a job and tasks comprising a job. For example, the job information 105 can include identifications of the tasks, dependencies of the tasks, an expected execution times of the tasks. The job information 105 can be provided to the processing system 101, for example, by a software developer. Additionally or alternatively, the processing system 101 can derive the job information by analyzing contents of the job u sing, for example, information generated by a compiler.

Figures 4, 5:
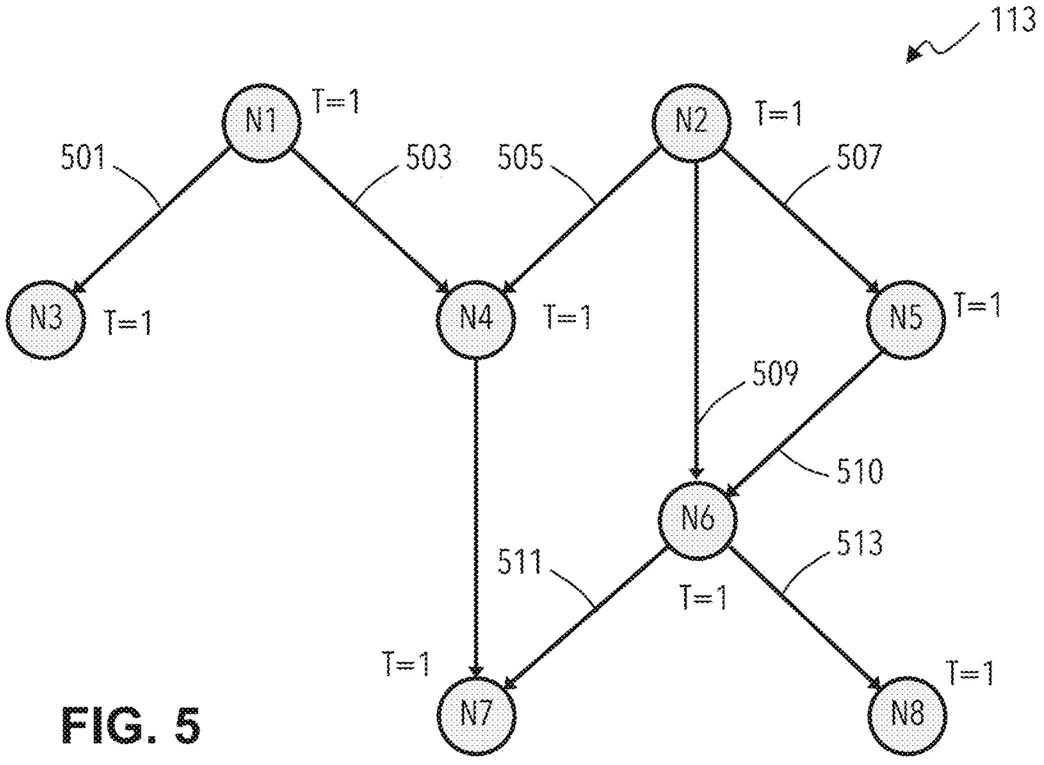
FIG. 4 illustrates an example relationship table in accordance with one or more embodiments.
FIG. 5 illustrates an example directed acyclic graph in accordance with one or more embodiments.

Relationship table generator 107 can be a computer program configured to generate a task relationship table 109 using the job information 105. The task relationship table 109 can include a list of tasks along with their dependency information and expected execution time, such as shown in FIG. 4 below. For example, in row 409 of relationship table 109 in FIG. 4, task N4 has an execution time of one minute, is dependent on tasks N1 and N2, and is a dependency of N7.

The directed acyclic graph (DAG) generator 111 can be a computer program configured to generate a dynamic acyclic graph 113 from the relationship table 109. As illustrated in FIG. 5, a dynamic acyclic graph is a topological representation of currently unexecuted tasks in a job and the dependencies between the tasks. For example, the dynamic acyclic graph 113 illustrated in FIG. 5 topologically represents information of the task relationship table 109 illustrated in FIG. 4. That is, the dynamic acyclic graph 113 comprises nodes labeled N1, N2, N3, N4, N5, N6, N7, and N8 corresponding to the task N1, task N2, task N3, task N4, task N5, task N6, task N7, and task N8 identified in column 401 of the task relationship table 109. Additionally, the dynamic acyclic graph 113 comprises edges 501, 503, 505, 507, 509, 511, and 513 between the nodes N1, N2, N3, N, 4, N5, N6, N7, and N8 corresponding to dependencies listed in columns 405 and 407 of task relationship table 109. For example, the example relationship table 109 in FIG. 4 indicates that task N1 in column 401 corresponds with two dependencies, tasks N3 and N4 in column 407. The example dynamic acyclic graph 113 illustrated in FIG. 5 topologically illustrates the dependencies by linking nodes N3 and N4 to node N1 via edges 501 and 503, respectively.

The dependency analyzer 114 can be a computer program, hardware, or a combination thereof configured to determine and update priorities for executing tasks or node based on current conditions. The dependency analyzer 114 communicates node priorities 115 to the queue 116. The node queue 116 can determine priorities using the task relationship table 109 based on a quantity of dependencies in column 407 and execution time in column 403 corresponding to the tasks in column 401 of relationship table 109 in FIG. 4. For example, the node queue 116 may prioritized task 2 over task 1 because task 2 has three dependencies and task 1 has two dependencies. Alternatively, the queue 116 can determine priorities based on edge counts of nodes and execution time of nodes in the dynamic acyclic graph 113 of FIG. 5. For example, the queue 116 may prioritize node N2 over node N1 because node N2 has an edge count of three (e.g., edges 505, 507, and 509); whereas node N1 has an edge count of two (e.g. edges 501 and 503).

Task executor 119 can be a multiprocessor device configured to concurrently process multiple tasks using multiple processor. The task executor 119 can include a number of executors (e.g., executor-1, executor-2, executor-3 . . . executor-N). The task executor 119 allocates each node that has been submitted using one of the available ready-to-process executors. The task executor 119 can output results executing the tasks corresponding to the nodes 117 to the result processor 123.

Elastic executor controller 121 can control the task executor 119 to elastically add or remove executors based on the queue size and execution characteristics such as workload, processing time, and resource utilization. For example, the elastic executor controller 121 can horizontally scale capacity of the task executor 119 by increasing or decreasing executors based on a quantity of nodes in the queue 116 being less than or greater than threshold values.

The result processor 123 can feedback result information 131 to the dependency analyzer 114 indicating whether the tasks were successfully executed. The result processor 123 can also return retry information 135 of unsuccessfully executed node to the queue 116 for execution. Based on the result information 131 and retry information 135, the dependency analyzer 114 can recalculate the dependencies of the unexecuted nodes. Using the recalculated dependencies, the dependency analyzer 114 can determine updated priority scores and queue unexecuted nodes with no dependents for execution.

C. Task Prioritization Architecture

Figure 2:
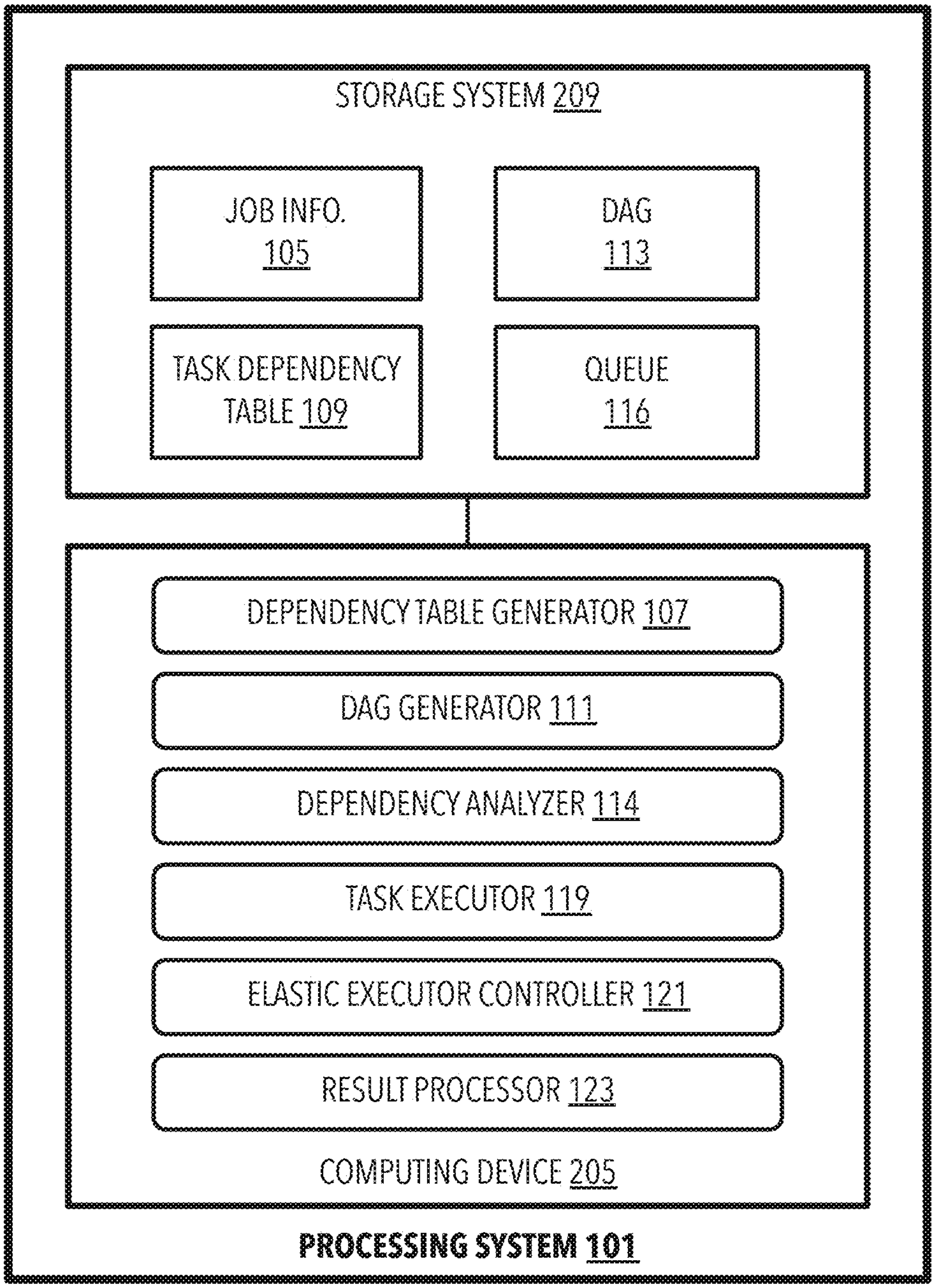
FIG. 2 illustrates a block diagram of an example system in accordance with one or more embodiments.

FIG. 2 shows a system block diagram illustrating an example of a processing system 101 in accordance with one or more embodiments. The processing system 101 can be the same or similar to that described above. The processing system 101 includes hardware and software that perform processes and functions disclosed herein. The processing system 101 can include a computing device 205 and a storage system 209. The computing device 205 can include one or more processors (e.g., microprocessor, microchip, or application-specific integrated circuit). The storage system 209 can comprise one or more non-transitory computer-readable, hardware storage devices that store information and computer-readable program instructions used by the processes and functions disclosed herein. For example, the storage system 209 can include one or more flash drives and/or hard disk drives. Additionally, the storage system 209 can store job information 105, task relationship table 109, dynamic acyclic graph 113, and queue 116, which can be the same or similar to those previously describe above. It is understood that some or all of the information stored in storage system 209 can be stored at a location remote from the server 110.

The computing device 205 can execute relationship table generator 107, dynamic acyclic graph generator 111, dependency analyzer 114, task executor 119, elastic executor controller 121, and result processor 123, each of which can be the same or similar to those discussed above and further described below. It is noted that the computing device 205 can comprise any general-purpose computing article of manufacture capable of executing computer program instructions installed thereon (e.g., a personal computer, server, etc.). However, computing device 205 is only representative of various possible equivalent-computing devices that can perform the processes described herein. To this extent, in embodiments, the functionality provided by the computing device 205 can be any combination of general and/or specific purpose hardware and/or computer program instructions. In each embodiment, the program instructions and hardware can be created using standard programming and engineering techniques, respectively.

The components illustrated in FIG. 2 may be implemented in software and/or hardware. Each component may be distributed over multiple applications and/or machines. Additionally, multiple components may be combined into one application and/or machine. Operations described with respect to one component may instead be performed by another component.

D. Multiprocessor Task Scheduling

Figure 3A:
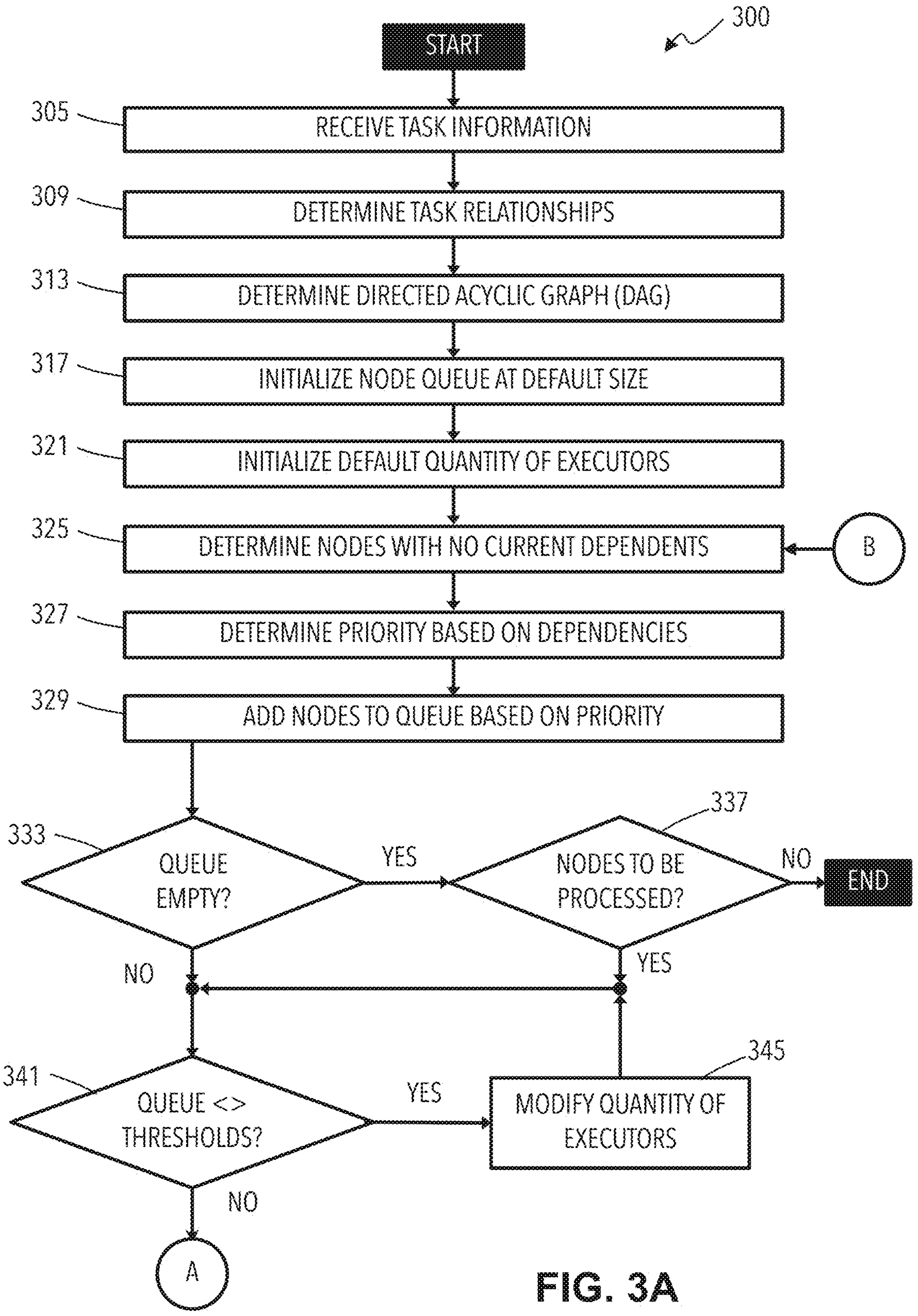
FIGS. 3A and 3B illustrate a set of operations of an example process for queuing tasks in accordance with one or more embodiments.
Figure 3B:
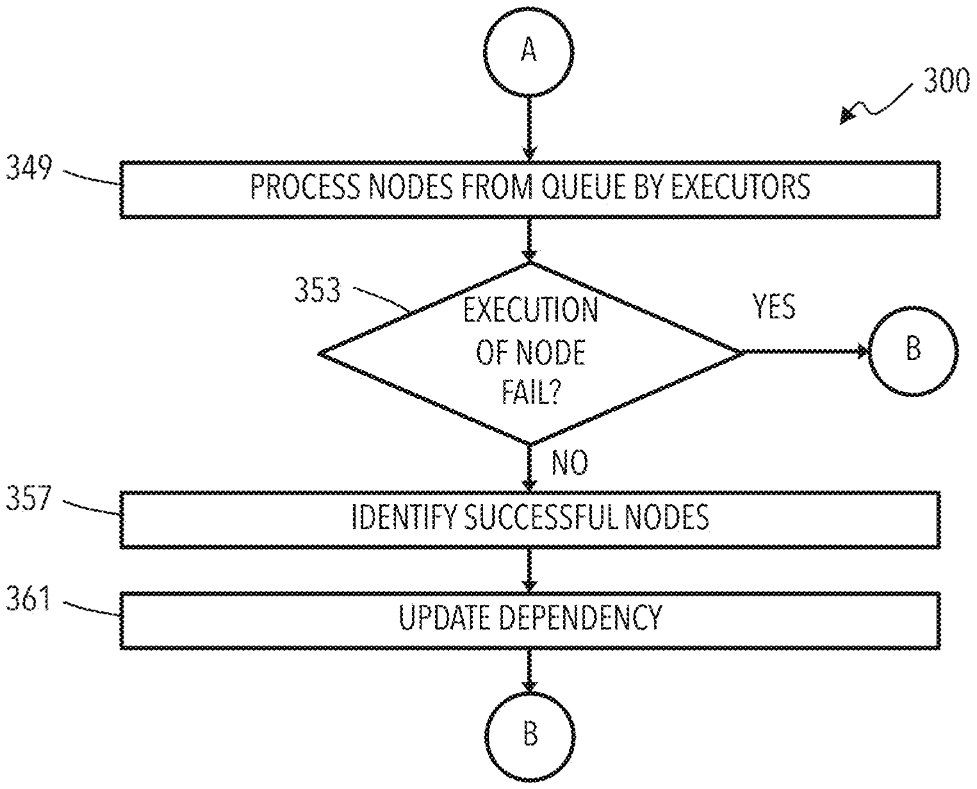

The flow diagram in FIGS. 3A and 3B illustrate functionality and operations of systems, devices, processes, and computer program products according to various implementations of the present disclosure. Each block FIGS. 3A and 3B can represent a module, segment, or portion of program instructions, which includes one or more computer executable instructions for implementing the illustrated functions and operations. In some implementations, the functions and/or operations illustrated in a particular block of the flow diagrams can occur out of the order shown in FIGS. 3A and 3B. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

FIGS. 3A and 3B illustrate a set of operations of an example process 300 for concurrently executing tasks of computing jobs in accordance with one or more embodiments. At block 305, a system (e.g., processing system 101) receives task information (e.g., job information 105). The task information can include metadata of tasks, such as task identifiers, relationships, and execution time. The execution time can be, for example, a maximum permitted execution time for individual tasks or a predicted execution time for individual tasks.

At block 309, the system (e.g., executing relationship table generator 107) determines relationships (e.g., dependents and dependencies) between tasks included in the task information received at block 305. The relationships can identify tasks upon which execution of a first task depends (e.g., dependents), as well as identification of any tasks that depend on successful execution of the first task (e.g., dependencies). For example, the system can determine a relationship table, such as relationship table 109 illustrated in FIG. 4. As shown in FIG. 4, for example, task N6 in column 400 depends on takes N2 in column 405, and tasks N7 and N8 depend on task N6.

At block 313, the system (e.g., executing dynamic acyclic graph generator 111), determines a dynamic acyclic graph based on the dependencies determined at block 309. For example, the dynamic acyclic graph 113 illustrated in FIG. 5 contains nodes N1-N8 corresponding to the tasks listed in column 401 of relationship table 109 and includes edges 501-513 connecting the nodes N1-N8 corresponding to the dependencies listed in columns 405 and 407 of relationship table 109.

At block 317, the system (e.g., executing dependency analyzer 114) initializes a node queue (e.g., node queue 116) at a default size. The default size can be a predetermined quantity established based on, for example, the quantity of tasks in an average job concurrently processed by a multiprocessor of the system (e.g., task executor 119). At block 321, the system (e.g., executing task executor 119) initializes a quantity of executors at a default size. Here, again, the default quantity can be a predetermined value established based on the quantity of tasks in an average job concurrently processed by the multiprocessor.

At block 325, the system (e.g., executing dependency analyzer 114) determines tasks in the task relationship table or corresponding nodes in the dynamic acyclic graph not currently dependent on any other task or node. For example, as illustrated in FIG. 5, nodes N1 and N2 are initially the only nodes in the dynamic acyclic graph 113 the do not depend from any other node; whereas nodes N3-N8 each depend from at least one other node.

At block 327, the system determines priorities for execution of individual nodes identified at block 325. The priority score may be determined as a function of one or more factors. For example, the system can determine priority using the following algorithm:

$$\text{Priority} = \max(\text{dependency count} + \text{processing time}). \quad (1)$$

In the above algorithm, dependency count can be a quantity of dependencies of a task listed in column 407 of task dependency table 109 or a count of a node's outgoing edges in dynamic acyclic graph 113. Processing time can be time listed in column 403 of task dependency table 109 or associated with nodes in dynamic acyclic graph 113 (e.g., 1 minute). Additional factors that may be used for computing the priority scores can include, but are not limited to, an amount of time that has passed since execution of the particular unexecuted task was requested and a static score associated with the particular unexecuted task.

At block 329, the system adds the nodes determined at block 325 to a queue (e.g., queue 116) in the order of the nodes priorities determined at block 327. At block 333, the system determines whether the queue is empty. If so (e.g. block 333 is "Yes"), then at block 337 the system determines whether any tasks in the task dependency table or nodes in the dynamic acyclic graph remain to be processed. If at block 337 there are no tasks or nodes to process (e.g., block 337 is "No"), then the process 300 ends. If at block 337 there are nodes remaining to process (e.g., block 337 is "Yes"), then the process 300 waits for additional nodes to be queued and proceed to block 341. If at block 333, the system determines the queue is not empty (e.g., block 333 is "No"), then at block 341 the system (e.g., executing elastic executor controller 121) determines whether the size of the queue exceeds an upper threshold or a lower threshold. If the size of the queue exceeds one of the thresholds (e.g., block 341 is "Yes"), then then the system modifies the quantity of executors to increase the or decrease quantity. For example, if the quantity of nodes included in the queue is 120% of the quantity of executors, then the system can add executors until a ratio of nodes-to-executors to less than 120%. On the other hand, if the quantity of nodes included in the queue is more than 80% of the quantity of executors, then the system can remove executors until a ratio of nodes-to-executors to less than 80%. If the size of the queue does not exceed one of the thresholds (e.g., block 341 is "No"), then the process 300 proceeds to block 349 of FIG. 3B, as indicated by off-page connector "A."

At block 349, the system processes nodes in the queue using the executors allotted at block 321 and block 345. Tasks corresponding to individual nodes can be executed by a respective processor based on the order of the nodes in the queue established at block 329. For example, as illustrated at "Minute 0" of FIG. 6 below, a queue of nodes can include nodes N2 and N1, which are executed by executors E1 and E2, respectively.

At block 353, the system (e.g., executing result processor 123) determines whether execution of any takes failed. If so (e.g., block 353 is "Yes"), then the process adds the failed nodes back to the queue at block 329, as indicated by off-page connector "B." Execution can fail when no executor is available to process a task, when processing of a task exceeds a predetermined time limit (e.g., as listed in column 403 of table 109 in FIG. 4), and when a code error or exception prevents complete execution of a task. For example, as illustrated at "Minute 1" of FIG. 6 below, a queue of nodes can be N3, N4, and N5. Nodes N3 and N4 can be executed by executors E1 and E2, respectively. Whereas no executor is currently available for node N5. As such, the node N5 is prioritized and executed in a next processing cycle, "Minute 2."

If at block 353, the system does not determine that execution of any nodes failed (e.g., block 353 is "No"), then at block 357 the system determines successfully executed nodes. At block 361, based on the successfully executed nodes determined at block 357. The process 300 then returns to block 325 via off-page connector "B," at which the system determines tasks in the task relationship table or corresponding nodes in the dynamic acyclic graph not dependent on any other task or node and, at block 327, determines current dependencies based on the updated dependency counts determined at block 361. By returning to blocks 325, embodiments determine updated priority scores for individual from a previous priority score determined for a preceding execution cycle.

E. EXAMPLE

Figure 6:
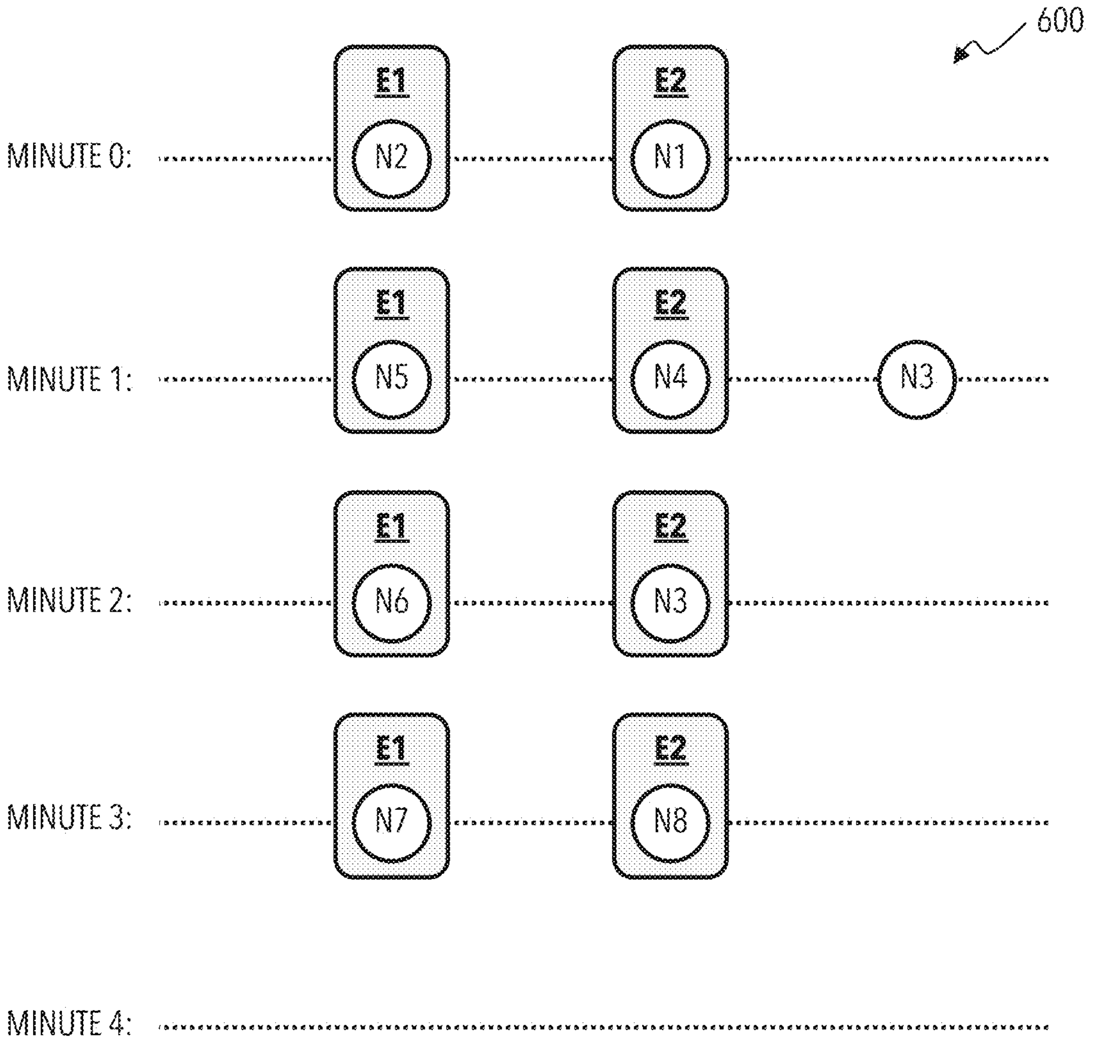
FIG. 6 illustrates an example of processing tasks in accordance with one or more embodiments.

FIG. 6 illustrates an example of executing tasks comprising computing jobs using the example relationship table 109 of FIG. 4 and the example dynamic acyclic graph 113 of FIG. 5. The present example includes only two executors E1 and E2 (e.g., executor-1 and executor-2 of task executor 119) and a queue size of 3 for the sake of example. It is understood that the implementations can include a greater number of processors and a correspondingly larger queue. For instance, implementations can include 16 executors and a queue size of 17. Additionally, as illustrated in column 403 of relationship table 109 in FIG. 4, the tasks N1-N8 in column 401 have an execution time of 1 minute for the sake of example. It is also understood that individual tasks N1-N8 can have different execution times and that the relationship table 109 can include a greater quantity of tasks.

In the present example, the system can prioritize execution of the nodes N1-N8 in the dynamic acyclic graph 113 in the queue based on, for individual nodes lacking a dependent (e.g., not depending from another unprocessed node), a respective outgoing edge count and processing time. For example, priority (P) for individual nodes can be determined from the current outgoing edge count a node and the processing time the node (e.g., P=max(outgoing edge count+processing time). In the present example, dynamic acyclic graph 113 initially includes nodes N1 and N2 that do not depend on any other node. Whereas nodes N3-N8 depend from at least one other node and, therefore, are not initially queued for execution. Applying the example priority function, the priority of N1 is 3 (e.g., 2 outgoing edges and processing time of 1) and N2 is 4 (e.g., 3 outgoing edges and processing time of 1). Accordingly, the system would prioritize the task corresponding to node N2 first in the queue for execution by executor E1 and the task corresponding to node N1 second in the queue for execution by executor E2, as illustrated in FIG. 6 at Minute 0.

After successful execution of N1 and N2 in a first processing cycle at Minute 0, the system revaluates dependencies of the remaining, unexecuted nodes N3-N8 for a next processing cycle at Minute 1. Because N1 and N2 were successfully executed in a prior execution cycle, none of the remaining nodes N3-N8 are currently dependent on N1 and N2. Thus, the dynamic acyclic graph 113 includes nodes N3, N4, and N5 that do not currently depend on any other node. Whereas nodes N6-N8 depend from at least one other node and, therefore, are not yet queued for execution. Applying the priority function, the priority of N3 is 1, N4 is 2, and N5 is 2. Accordingly, the system prioritizes the task corresponding to nodes N4 and N5 in the queue before the task corresponding to N3. Because the example only includes two executors E1 and E2, the tasks corresponding to N5 and N4 are processed, while N3 is queued but unprocessed, as illustrated in FIG. 6 at Minute 1.

After successful execution of N5 and N4 in the second processing cycle at Minute 1, the system revaluates the dependencies of the remaining, unexecuted nodes N3 and N6-N8. Because N1, N2, N4, and N5 were successfully executed, none of the remaining nodes N3 and N6-N8 are currently dependent on N1, N2, N4, and N5. Thus, the dynamic acyclic graph 113 includes nodes N3 and N6 that do not depend on any other node. Whereas nodes N7 and N8 depend from at least one other node and, therefore, are not queued for execution. Applying the priority function, the priority of N3 is 1 and the priority of N6 is 3. Accordingly, in a third processing cycle at Minute 2, the system would prioritize the task corresponding to node N6 first in the queue and the task corresponding to node N3 second in the queue.

After successful execution of N3 and N6 in the third processing cycle at Minute 2, the system again revaluates the dependencies of the remaining, unexecuted nodes N7 and N8. Because N1-N6 were successfully executed, none of the remaining nodes N7 and N8 are dependent on N1-N6. Thus, the dynamic acyclic graph 113 includes nodes N7 and N8 that do not depend on any other node. Applying the priority function, the priority of N7 is 1 and N8 is 1. Accordingly, in a fourth processing cycle at Minute 3, the system would prioritize the tasks corresponding to nodes N7 and N8 equally in the queue. After successful execution of N7 and N8, all the nodes N1-N8 have been executed and the process ends.

In the example of FIG. 6, the system priority queue is primarily based on outgoing edge count and can be secondarily based on processing time. Priorities for nodes of unexecuted tasks are updated in for each processing cycle based on the current dependencies of individual nodes. By doing so, executors can be active a majority of the time, which minimizes execution time and conserves computing resources.

F. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
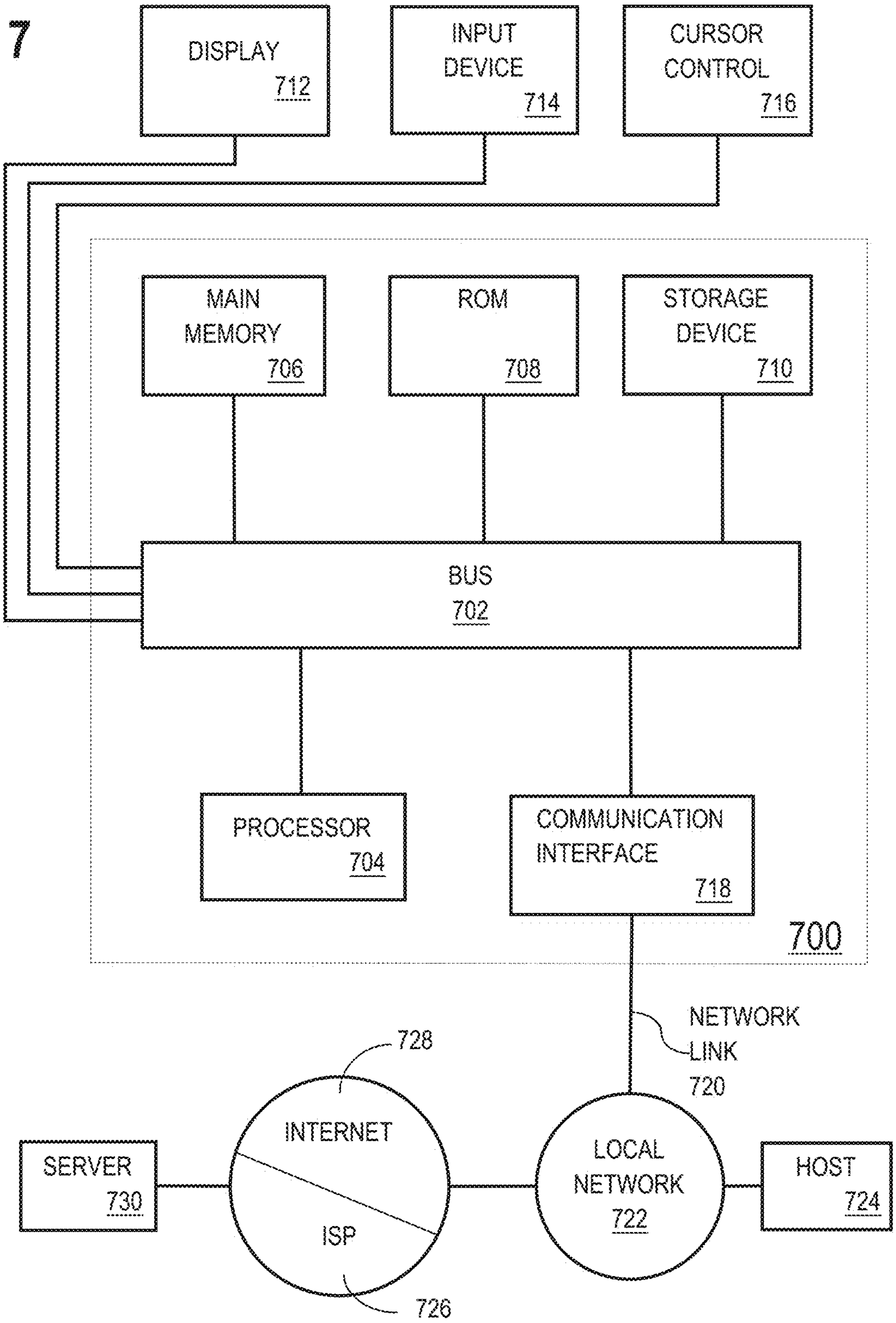
FIG. 7 shows a block diagram illustrating an example computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722.

For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

G. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

for each particular task of a plurality of tasks to be executed, identifying one or more dependent tasks for the particular task such that the particular task must be executed prior to executing the one or more dependent tasks for the particular task;

identifying a first task, of the plurality of tasks, that is ready to be executed and does not require any other tasks of the plurality of tasks to be executed prior to execution of the first task;

identifying a second task, of the plurality of tasks, that is ready to be executed and does not require any other tasks of the plurality of tasks to be executed prior to execution of the second task;

identifying (a) a first set of dependent tasks that depend on execution of the first task and (b) a second set of dependent tasks that depend on execution of the second task;

determining that a first number of dependent tasks in the first set of dependent tasks is less than a second number of dependent tasks in the second set of dependent tasks; and responsive at least to determining that the first number of dependent tasks is less than the second number of dependent tasks, executing the second task prior to executing the first task.

2. The medium of claim 1, wherein the operations further comprise:

identifying a third task, of the plurality of tasks, that is ready to be executed and does not require any other tasks of the plurality of tasks to be executed prior to execution of the first task;

identifying a fourth task, of the plurality of tasks, that is ready to be executed and does not require any other tasks of the plurality of tasks to be executed prior to execution of the second task;

determining that (a) an execution time of the fourth task is more than (b) an execution time of the third task; and responsive at least to determining that the execution time of the fourth task is more than the execution time of the third task, executing the fourth task prior to executing the third task.

3. The medium of claim 1, wherein the operations further comprise:

identifying a third task, of the plurality of tasks, that is ready to be executed and does not require any other tasks of the plurality of tasks to be executed prior to execution of the first task;

identifying a fourth task, of the plurality of tasks, that is ready to be executed and does not require any other tasks of the plurality of tasks to be executed prior to execution of the second task;

determining that (a) an execution time of the fourth task is less than (b) an execution time of the third task; and responsive at least to determining that the execution time of the fourth task is less than the execution time of the third task, executing the fourth task prior to executing the third task.

4. The medium of claim 1, wherein the operations further comprise determining that the first task is ready to be executed in response to determining that each of a third set of tasks, upon which the first task depends, have been executed.

5. The medium of claim 1, wherein the operations further comprise recalculating dependency relationships between tasks in the plurality of tasks prior to determining the first set of dependent tasks and the second set of dependent tasks.

6. The medium of claim 1, wherein the operations further comprise recalculating dependency relationships prior to each selection operation for selecting tasks, from the plurality of tasks, for execution.

7. The medium of claim 1, wherein the operations further comprise recalculating dependency relationships in response to (a) addition of tasks to the plurality of tasks, (b) removal of tasks from the plurality of tasks, or (c) execution of tasks in the plurality of tasks.

8. The medium of claim 1, wherein executing the second task prior to executing the first task comprises queuing the second task in an execution queue prior to the first task.

9. The medium of claim 8, wherein the operations further comprise increasing or decreasing a number of executors being used to execute tasks in the execution queue based on a number of tasks currently in the execution queue.

10. The medium of claim 9, wherein the operations further comprise:
- inserting the first task into a queue subsequent to a third task and prior to a fourth task based on the first set of dependent tasks for the first task being less than a third set of dependent tasks for the third task and greater than a fourth set of dependent tasks for the fourth task.

11. The medium of claim 1, wherein the operations further comprise:
- generating a directed acyclic graph wherein each node in the directed acyclic graph corresponds to a task, and wherein each edge in the directed acyclic graph corresponds to a dependency between a pair of tasks,
  - wherein determining the first set of dependent tasks for the first task comprises determining a number of outbound edges from a first node in the acyclic graph that represents the first task.

12. A method comprising:
- for each particular task of a plurality of tasks to be executed, identifying one or more dependent tasks for the particular task such that the particular task must be executed prior to executing the one or more dependent tasks for the particular task;
- identifying a first task, of the plurality of tasks, that is ready to be executed and does not require any other tasks of the plurality of tasks to be executed prior to execution of the first task;
- identifying a second task, of the plurality of tasks, that is ready to be executed and does not require any other tasks of the plurality of tasks to be executed prior to execution of the second task;
- identifying (a) a first set of dependent tasks that depend on execution of the first task and (b) a second set of dependent tasks that depend on execution of the second task;
- determining that a first number of dependent tasks in the first set of dependent tasks is less than a second number of dependent tasks in the second set of dependent tasks; and
- responsive at least to determining that the first number of dependent tasks is less than the second number of dependent tasks, executing the second task prior to executing the first task.

13. The method of claim 12 further comprising:
- identifying a third task, of the plurality of tasks, that is ready to be executed and does not require any other tasks of the plurality of tasks to be executed prior to execution of the first task;
- identifying a fourth task, of the plurality of tasks, that is ready to be executed and does not require any other tasks of the plurality of tasks to be executed prior to execution of the second task;
- determining that (a) an execution time of the fourth task is more than (b) an execution time of the third task; and
- responsive at least to determining that the execution time of the fourth task is more than the execution time of the third task, executing the fourth task prior to executing the third task.

14. The method of claim 12 further comprising:
- identifying a third task, of the plurality of tasks, that is ready to be executed and does not require any other tasks of the plurality of tasks to be executed prior to execution of the first task;
- identifying a fourth task, of the plurality of tasks, that is ready to be executed and does not require any other tasks of the plurality of tasks to be executed prior to execution of the second task;
- determining that (a) an execution time of the fourth task is less than (b) an execution time of the third task; and
- responsive at least to determining that the execution time of the fourth task is less than the execution time of the third task, executing the fourth task prior to executing the third task.

15. The method of claim 12 further comprising determining that the first task is ready to be executed in response to determining that each of a third set of tasks, upon which the first task depends, have been executed.

16. The method of claim 12 further comprising recalculating dependency relationships between tasks in the plurality of tasks prior to determining the first set of dependent tasks and the second set of dependent tasks.

17. The method of claim 12 further comprising recalculating dependency relationships prior to each selection operation for selecting tasks, from the plurality of tasks, for execution.

18. The method of claim 12 further comprising recalculating dependency relationships in response to (a) addition of tasks to the plurality of tasks, (b) removal of tasks from the plurality of tasks, or (c) execution of tasks in the plurality of tasks.

19. The method of claim 12, wherein executing the second task prior to executing the first task comprises queuing the second task in an execution queue prior to the first task.

20. The method of claim 19 further comprising increasing or decreasing a number of executors being used to execute tasks in the execution queue based on a number of tasks currently in the execution queue.

21. The method of claim 20 further comprising:
- inserting the first task into a queue subsequent to a third task and prior to a fourth task based on the first set of dependent tasks for the first task being less than a third set of dependent tasks for the third task and greater than a fourth set of dependent tasks for the fourth task.

22. The method of claim 12 further comprising:
- generating a directed acyclic graph wherein each node in the directed acyclic graph corresponds to a task, and wherein each edge in the directed acyclic graph corresponds to a dependency between a pair of tasks,
- wherein determining the first set of dependent tasks for the first task comprises determining a number of outbound edges from a first node in the acyclic graph that represents the first task.

23. A system comprising:
- at least one device including a hardware processor; and
- a non-transitory computer-readable storage device storing program instructions that, when executed by the hardware processor, configure the system to perform operations comprising:
  - for each particular task of a plurality of tasks to be executed, identifying one or more dependent tasks for the particular task such that the particular task must be executed prior to executing the one or more dependent tasks for the particular task;

identifying a first task, of the plurality of tasks, that is ready to be executed and does not require any other tasks of the plurality of tasks to be executed prior to execution of the first task;

identifying a second task, of the plurality of tasks, that is ready to be executed and does not require any other tasks of the plurality of tasks to be executed prior to execution of the second task;

identifying (a) a first set of dependent tasks that depend on execution of the first task and (b) a second set of dependent tasks that depend on execution of the second task;

determining that a first number of dependent tasks in the first set of dependent tasks is less than a second number of dependent tasks in the second set of dependent tasks; and responsive at least to determining that the first number of dependent tasks is less than the second number of dependent tasks, executing the second task prior to executing the first task.

* * * * *